(12) United States Patent
Minaai et al.

(10) Patent No.: US 7,141,130 B2
(45) Date of Patent: Nov. 28, 2006

(54) GLASS PANEL

(75) Inventors: Tetsuo Minaai, Osaka (JP); Masao Misonou, Osaka (JP); Toru Futagami, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 11/378,737

(22) Filed: Mar. 17, 2006

(65) Prior Publication Data

US 2006/0207217 A1   Sep. 21, 2006

Related U.S. Application Data

(62) Division of application No. 10/311,075, filed as application No. PCT/JP01/05040 on Jun. 13, 2001.

(30) Foreign Application Priority Data

| Jun. 14, 2000 | (JP) | .............................. 2000-177910 |
| Oct. 24, 2000 | (JP) | .............................. 2000-323754 |
| Feb. 14, 2001 | (JP) | .............................. 2001-37087 |

(51) Int. Cl.
*B32B 37/06* (2006.01)

(52) U.S. Cl. ........................ 156/107; 156/104; 156/109

(58) Field of Classification Search ................ 156/107, 156/104, 109
See application file for complete search history.

(56) References Cited

U.S. PATENT DOCUMENTS

| 1,774,860 | A | * | 9/1930  | Wendler et al. .............. 165/170 |
| 4,305,982 | A | * | 12/1981 | Hirsch .......................... 428/34 |
| 4,514,450 | A | * | 4/1985  | Nowobilski et al. ......... 428/120 |
| 4,909,875 | A | * | 3/1990  | Canaud et al. ............... 156/109 |
| 5,017,252 | A | * | 5/1991  | Aldrich et al. .............. 156/109 |
| 5,270,084 | A | * | 12/1993 | Parker .......................... 428/34 |
| 5,489,321 | A | * | 2/1996  | Tracy et al. .................... 65/43 |
| 5,521,371 | A | * | 5/1996  | Hotta et al. .................. 235/487 |
| 5,612,387 | A | * | 3/1997  | Ogawa ...................... 156/274.4 |
| 5,643,644 | A | * | 7/1997  | Demars ....................... 428/34 |
| 5,664,395 | A | * | 9/1997  | Collins et al. ............. 52/786.13 |
| 5,786,096 | A | * | 7/1998  | Yoneda et al. .............. 428/447 |
| 5,807,166 | A | * | 9/1998  | Bando .......................... 451/43 |
| 5,902,652 | A | * | 5/1999  | Collins et al. ................ 428/34 |
| 5,989,659 | A | * | 11/1999 | Kato et al. ..................... 428/34 |
| 6,103,324 | A | * | 8/2000  | Collins et al. ................ 428/34 |
| 6,210,763 | B1 | * | 4/2001  | Katoh et al. .................. 428/34 |
| 6,216,417 | B1 | * | 4/2001  | Morin et al. ............... 52/786.1 |
| 6,291,036 | B1 | * | 9/2001  | Wang et al. .................. 428/34 |
| 6,309,733 | B1 | * | 10/2001 | Minaai et al. .............. 428/192 |
| 6,352,749 | B1 | * | 3/2002  | Aggas .......................... 428/34 |
| 6,387,460 | B1 | * | 5/2002  | Shukuri et al. ............... 428/34 |
| 6,399,169 | B1 | * | 6/2002  | Wang et al. .................. 428/34 |

(Continued)

FOREIGN PATENT DOCUMENTS

JP          55-047232        *   4/1980

(Continued)

*Primary Examiner*—Jessica Rossi
(74) *Attorney, Agent, or Firm*—Fulbright & Jaworski L.L.P.

(57) ABSTRACT

A glass panel (P) comprising a pair of glass plates (1A, 1B) opposed to each other, spacers (2) disposed between the pair of glass plates for maintaining a gap therebetween, and a sealing member (3) having a lower melting point than the glass plates (1) for sealing the pair of glass plates (1A, 1B) at outer peripheries (9) thereof to form a decompression void (V) between the pair of glass plates (1A, 1B), wherein a compressive force Fc is allowed to remain at outer surfaces of the outer peripheries (9) of the glass plates (1), with the decompression void (V) being in atmospheric pressure condition.

1 Claim, 12 Drawing Sheets

U.S. PATENT DOCUMENTS

| | | |
|---|---|---|
| 6,420,002 B1 * | 7/2002 | Aggas et al. .................. 428/34 |
| 6,436,493 B1 * | 8/2002 | Asano et al. .................. 428/34 |
| 6,444,281 B1 * | 9/2002 | Wang et al. .................. 428/34 |
| 6,479,112 B1 * | 11/2002 | Shukuri et al. ............... 428/34 |
| 6,497,931 B1 * | 12/2002 | Aggas .......................... 428/34 |
| 6,503,583 B1 * | 1/2003 | Nalepka et al. ............... 428/34 |
| 6,506,272 B1 * | 1/2003 | Aggas ........................ 156/109 |
| 6,635,321 B1 * | 10/2003 | Wang et al. ................... 428/34 |
| 6,663,923 B1 * | 12/2003 | Futagami et al. ............. 428/34 |
| 6,955,026 B1 * | 10/2005 | Misonou .................. 52/786.13 |
| 2002/0064610 A1 * | 5/2002 | Misonou ...................... 428/34 |

FOREIGN PATENT DOCUMENTS

| | | | |
|---|---|---|---|
| JP | 04-055349 | * | 2/1992 |
| JP | 11-199279 | * | 7/1999 |
| WO | WO 93/15296 | * | 8/1993 |
| WO | WO 97/24297 | * | 7/1997 |

* cited by examiner

FIG.6
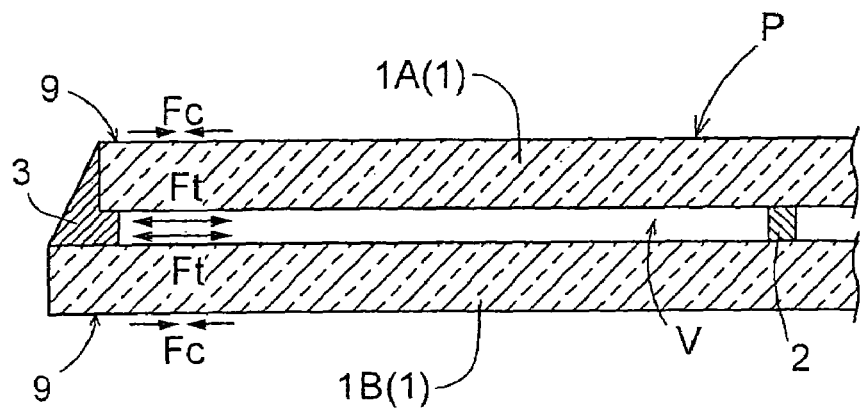
FIG.7
(A)
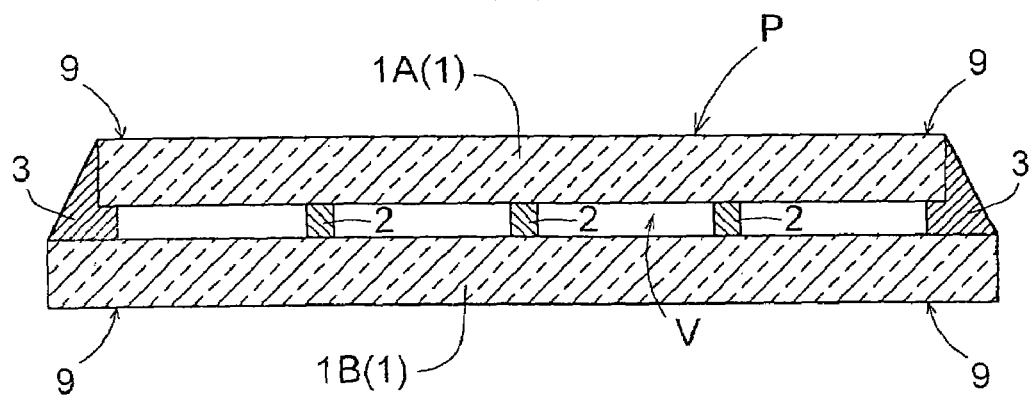
PRIOR ART
(B)
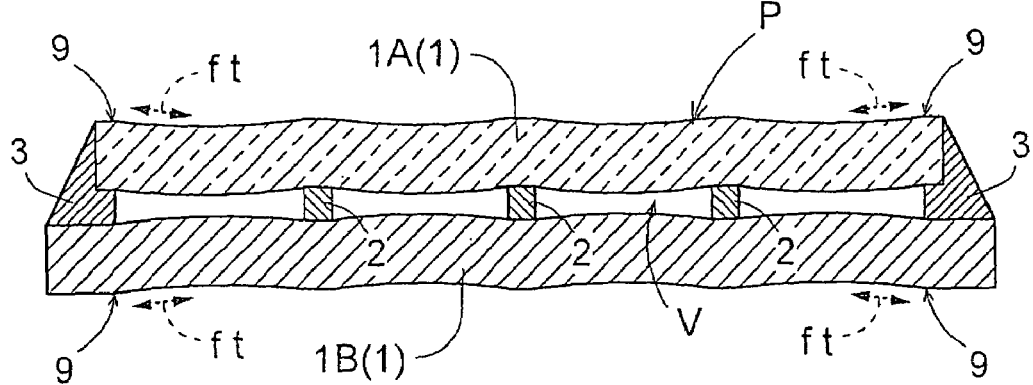
PRIOR ART

GLASS PANEL

TECHNICAL FIELD

This application is a divisional application of U.S. Ser. No: 10/311,075 filed Jan. 7, 2003, incorporated herein by reference in its entirety, which is a §371 of PCT/JP01/05040 filed Jun. 13, 2001, which claims priority from Japanese Patent Application No. 2000-177910 filed Jun. 14, 2000, Japanese Patent Application No. 2000-323754 filed Oct. 24, 2000 and Japanese Patent Application No. 2001-37087, filed Feb. 14, 2001.

The present invention relates to a glass panel comprising a pair of glass plates opposed to each other, spacers disposed between the pair of glass plates for maintaining a gap therebetween, and a sealing member having a lower melting point than the glass plates for sealing the pair of glass plates at outer peripheries thereof to define a decompression void between the pair of glass plates.

BACKGROUND ART

The above glass panel is intended to enhance a thermal insulation. performance by maintaining the decompression void. defined between the glass plates in a decompressed condition. In sealing the pair of glass plates at the outer peripheries thereof, the entire glass panel is heated to a predetermined temperature to melt the sealing member provided between the outer peripheries of the glass plates. The melted sealing member is then cooled and solidified, thereby to fix the glass plates to each other at the outer peripheries thereof.

With the conventional glass panel, the entire glass panel is gradually cooled for cooling and solidifying the melted sealing member, in order to prevent internal stress from remaining in the glass plates as a result of the cooling operation and distorting the glass panel.

To this end, as schematically shown in FIG. 7, when the decompression void V in the glass panel P of FIG. 7(A) is decompressed, a strong tensile force acts on outer surfaces of the outer peripheries 9 adjacent where the glass plates 1A and 1B are sealed by the sealing member 3. As shown in FIG. 7(B), such a tensile force remains there with the decompression void V maintained in the decompressed. condition to disadvantageously generate cracks in the glass plates I due to flaws on the surfaces of the glass plates 1 or external forces applied to the glass plates 1. As a result, the decompression void V cannot be maintained in the decompressed condition for a. long period, and the glass plates 1 per se may easily be damaged.

More particularly, the above glass panel P has the glass plates 1 yielding toward the decompression void V under the pressure difference between the pressure within the decompression void V and atmospheric pressure as the decompression void V is decompressed. Since the decompression void V is decompressed with the pair of glass plates 1A and 1B fixed and bound by the sealing member 3 at the outer peripheries thereof, a strong tensile force ft remains in the outer surfaces of the outer peripheries 9 of the glass plates 1 adjacent where the glass plates are sealed by the sealing member 3 with the decompression void V maintained in the decompressed condition. Consequently, the tensile stress concentrates on flaws on the surfaces of the glass plates 1, and a resultant force of a tensile force due to an external force and the residual tensile force ft is increased, thereby tending to generate cracks in the glass plates 1.

The present invention has been made having regard to the state of the art noted above, and its object is to prevent cracks from generating in the glass plates due to flaws on the glass surfaces and external forces applied to the glass plates with the decompression void maintained in a decompressed condition.

DISCLOSURE OF THE INVENTION

A glass panel according to the present invention has the following characteristic construction.

As schematically shown in FIG. 3(D) and FIG. 6, a. glass panel according to the present invention comprises a pair of glass plates 1A and 1B opposed to each other, spacers 2 disposed between. the pair of glass plates for maintaining a gap therebetween, and a sealing member 3 having a lower melting point than the glass plates 1 for sealing the pair of glass plates 1A and 1B at outer peripheries thereof to form a decompression void V between the pair of glass plates IA and 1B, characterized in that a compressive force Fc is allowed, to remain at the outer surfaces of the outer peripheries 9 exposed to the atmosphere of the glass plates 1, with said decompression void V being in atmospheric pressure condition.

With this construction, since the compressive force Fc remains at the outer surfaces of the outer peripheries of the glass plates, with the decompression void being at atmospheric pressure, hardly any strong tensile force remains at the outer surface of the outer peripheries of the glass plates even when the decompression void is maintained in a decompressed condition.

More particularly, as shown in FIG. 4, each glass plate 1 is deflected toward the decompression void V by the pressure difference between the pressure within the decompression void V and atmospheric pressure as the decompression void V is decompressed, with the pair of glass plates IA and IB fixed to each other at the outer peripheries by the sealing member 3. Then, a strong tensile force ft could occur at the outer surfaces of the outer peripheries 9 of the glass plates I. However, the compressive force Fc remaining at the outer surfaces of the outer peripheries 9 of the glass plates 1. acts as pre-stress to reduce the tensile force (ft–Fc) actually remaining at the outer surfaces of the outer peripheries of the glass plates 1.

Thus, since the tensile force remaining at the outer surfaces of the outer peripheries of the glass plates is reduced, with the decompression void V maintained in the decompressed condition, the stress concentrating on any flaws on the glass plate surfaces may be diminished. Further, even when an external force is applied to the glass plates, only a weak resultant is caused by a tensile force due to the external force and the residual tensile force, thereby to prevent cracks from generating in the glass plates.

In a preferred embodiment, it is preferable that the low melting point sealing member 3 is started to harden from an outer surface thereof exposed to the atmosphere in sealing the pair of glass plates 1A and 1B to each other at the outer peripheries thereof, and further the pair of glass plates 1A and 1B are started to cool from the outer surface, and wherein the compressive force is allowed to remain in each of the outer surfaces of the outer peripheries 9 as a stress produced when manufacturing the glass panel.

Further, in other preferred embodiments, it is preferable that the decompression void V is set to a pressure of 0.01 Torr or less, and wherein the compressive force remaining in each of the outer surfaces of the outer peripheries 9 of the glass plates i is 0.5 to 4.0 MPa.

In order to realize such a glass panel, it is suggested to manufacture a glass panel P including a pair of glass plates 1A and 1B opposed to each other, spacers 2 disposed between the pair of glass plates for maintaining a gap therebetween, and a sealing member 3 having a melting point lower than that of the glass plates 1 for sealing the pair of glass plates 1A and 1B at outer peripheries thereof to formed a decompression void V between the pair of glass 1A and 1B, the method comprising the steps of, applying the low melting point sealing member 3 to the outer peripheries 9 of the pair of glass plates 1A and 1B in a melted condition, causing the sealing member to start to harden from, an outer surface thereof exposed to the atmosphere by lowering temperature, and causing the pair of glass plates 1A and 1B to start to cool from the outer surface, wherein a compressive force is allowed to remain in each of outer surfaces of the outer peripheries 9 of the glass plates 1 with the decompression void V being in the atmospheric pressure condition.

According to another embodiment of the invention, a glass panel P is provided, as shown in FIGS. 9 and 10, comprising glass plates I cut by forming cutting portions 13 by a cutter in a surface of one of the glass plates and arranged in a pair to define a decompression void V between opposite surfaces thereof, the glass plates being rigidly adhered to each other at outer peripheries thereof by a sealing member 11, characterized in that at least one glass plate 1 of the pair of glass plates 1A and 1B is arranged to have the cut portions 13 thereof directed to the decompression void V, and that the glass panel is a vacuum double glazing with the decompression void V being in a decompressed condition. With this construction, since at least one of the pair of glass plates 1A and 1B is arranged to have cut portions 13 thereof directed to the decompression void V, it is possible to restrain the risk of damaging the glass due to an external load such as a wind pressure or impact.

More particularly, a strong tensile stress is exerted on surfaces of the outer peripheries exposed to the atmosphere of each glass plate when a load such as a wind pressure or impact is applied from outside. If cut portions having fine cracks are arranged on the surfaces of the outer peripheries exposed to the atmosphere where the tensile stress is exerted, the fine cracks are pulled by the strong tensile force to be easily developed to damage the glass. Compared with the tensile stress exerted on the surfaces of the outer peripheries exposed to the atmosphere, only a weak tensile stress is exerted on surfaces of the outer peripheries adjacent to the decompression void and facing away from the surfaces of the outer peripheries exposed to the atmosphere of the glass plates, thereby to reduce the risk of damaging the glass. Therefore, the arrangement of the cut portions of at least one of the glass plates directed to the decompression void and facing away from the atmosphere makes it possible to restrain the risk of developing the cracks, compared with the arrangement of the respective cut portions of both of the glass plates exposed to the atmosphere, thereby to reduce the risk of damaging the glass.

As a result, the glass panel capable of improving glass strength against external loads is provided.

In the case of the vacuum double glazing, since the decompression void is decompressed, the tensile force is already exerted on each of the outer peripheries of the glass plates due to atmospheric pressure acting on the outer surfaces of both of the glass plates. In this sense, the effects achieved by the arrangement of the cutting portion directed to the decompression void become more remarkable.The present invention according to the embodiment as shown in FIG. 12, is characterized in that the pair of glass plates 1A and 1B have cut portions 13 directed to the decompression void V, respectively.

With this construction, in addition to the effects achieved by the invention according to a preferred embodiment the respective cut portions of the pair of glass plates are directed to the decompression void, which may further restrain the risk of damaging the glass due to an external load such as a wind pressure or impact.

More particularly, the arrangement of the respective cut portions of both of the glass plates directed to the decompression void opposite from the atmosphere makes it possible to further restrain the risk of developing the cracks, compared with the arrangement of the respective cut portions of both of the glass plates exposed to the atmosphere, thereby to further reduce the risk of damaging the glass.

As a result, the glass panel capable of further improving the glass strength against external loads is provided.

The present invention, according to a preferred embodiment as shown in FIGS. 14 and 15, provides a glass panel P characterized in that the cut portions 13 are covered by the sealing member 11.

With this construction, in addition to other effects achieved by the invention the cut portions are covered by the sealing member, thereby to prevent development of the cracks due to water present in the air.

More particularly, the fine cracks generated in the cut portions 13 are unstable with high activity compared with other parts of the glass surfaces. Thus, as the cracks are constantly exposed to the ambient air, the Si—O bonds in the glass surfaces are broken by a reaction to water (H2O) present in the air to destroy the glass structure and further develop the cracks to cause the risk of damaging the glass. According to the construction noted above, the sealing member 11 covers the cut portions 13 thereby to minimize the chance of contacting water ($H_2O$) in the air and prevent the Si—O bonds in the glass surfaces from being easily broken., as a result of which development of the cracks can be checked.

Consequently, the glass panel capable of improving the glass strength against water present in the air is provided.

In the above-noted construction, it is preferable that a compressive force is allowed to remain in each of outer surfaces of the outer peripheries 9 of the glass plates 1 with the decompression void V being in the atmospheric pressure condition, wherein the sealing member 11 is started to harden from an outer surface thereof exposed to the atmosphere in sealing the pair of glass plates 1A and 1B to each other at the outer peripheries thereof, and further the pair of glass plates 1A and 1B are started to cool from the outer surface, and wherein the compressive force is allowed to remain in each of the outer surfaces of the outer peripheries 9 as a stress produced when manufacturing the glass panel.

In employing such a construction, it is also preferable that the decompression void V is set to a pressure of 0.01 Torr or less, and wherein the compressive force remaining in each of the outer surfaces of the outer peripheries 9 of the glass plates 1 is 0.5 to 4.0 MPa.

The present invention according to a preferred embodiment as shown in FIGS. 18 and 19, provides a glass panel P comprising a pair of glass plates 1A and 1B arranged to define a decompression void V between opposite surfaces thereof, the pair of glass plates 1A and 1B being rigidly adhered to each other at outer surfaces of the outer peripheries 9 thereof by a sealing member 11, characterized in that at least one glass plate 1A or 1B of the pair of glass plates 1A and 1B has edge portions 14 exposed to the atmosphere and facing away from the decompression void V chamfered as at 14*a* by grinding, and that the glass panel P is a vacuum double glazing with the decompression void V being in a decompressed environment.

With this construction in which the pair of glass plates define the decompression void between the opposite surfaces thereof and are rigidly adhered to each other at the outer peripheries thereof by the sealing member. Edge portions exposed to the atmosphere and facing away from the decompression void of at least one of the pair of glass plates are chamfered as at 14*a* by grinding. As a result, it is possible to reduce the risk of damaging the glass due to an external load such as a wind pressure or impact.

More particularly, as noted, above, when an external load such as a wind pressure or impact acts on the glass panel, a strong tensile force is exerted on the surfaces of the outer peripheries of one of the pair of glass plates exposed to the atmosphere, while a strong compressive force is exerted on the surfaces of the other of the pair of glass plates exposed to the atmosphere. Development of the cracks is more noticeable in the portions where the tensile stress is exerted. Thus, even the fine cracks generated in the edge portions of the glass plate exposed to the atmosphere where the tensile stress is exerted may be developed by the strong tensile stress. However, since such cracks are removed by chamfering the edge portions exposed to the atmosphere by grinding, it is possible to prevent the cracks from developing even if the large stress is exerted thereon, thereby to restrain the risk of damaging the glass.

Further, as shown in FIGS. 16, 18 and 19, since the glass panel is the vacuum double glazing with the decompression void being in a decompressed environment, the tensile force is already exerted on each of the surfaces exposed to the atmosphere of the glass plates while the compressive force is already exerted on each of the surfaces adjacent to the decompression void due to the atmospheric pressure acting on the outer surfaces of both of the glass plates. Thus, as noted above, it is highly effective to carry out the chamfering treatment, which results in the strong vacuum double glazing having a excellent heat insulating performance.

The present invention according to a preferred embodiment, as shown in FIGS. 18 and 19, provides a glass panel characterized in that the edge portions 14 exposed to the atmosphere of the pair of glass plates 1A and 1B are chamfered as at 14*a* by grinding, respectively.

With this construction, since the respective edge portions of the pair of glass plates exposed to the atmosphere arc chamfered by grinding, the cracks generated in the edge portions exposed to the atmosphere of both of the glass plates where the tensile stress is exerted and where the compressive force is exerted are removed by chamfering the edge portions by grinding. As a result, it is possible to further reduce the risk of damaging the glass due to a load such as a wind pressure and impact.

The present invention according to a preferred embodiment as shown in FIG. 19, provides a glass panel P characterized in that edge portions 15 adjacent to the decompression void of the pair of glass plates 1A and 1B are chamfered as at 15*a* by grinding, respectively.

With this construction, since the respective edge portions adjacent to the decompression void of both of the glass plates are chamfered by grinding, cracks arc removed from the edge portions adjacent to the decompression void where a tensile stress and compressive stress, weak as they may be, are generated., as well as those in the edge portions exposed to the atmosphere where a strong tensile stress and compressive stress are generated. As a result, a glass panel strong against a load such as a wind pressure or impact is provided.

Further, in the glass panel according to preferred embodiments, it is preferable that a compressive force is allowed to remain in each of outer surfaces of the outer peripheries 9 of the glass plates 1 with the decompression void V being in the atmospheric pressure condition, wherein the sealing member 11 is started to harden from an outer surface thereof adjacent to the atmosphere in sealing the pair of glass plates 1A and 1B to each other at the outer peripheries thereof, and further the pair of glass plates 1A and 1B are started to cool from. the outer surfaces, and wherein the compressive force is allowed to remain in each of the outer surfaces of the outer peripheries 9 as a stress produced when manufacturing the glass panel.

Similarly, it is preferable that the decompression void V is set to a pressure of 0.01 Torr or less, and wherein the compressive force remaining in each of the outer surfaces of the outer peripheries 9 of the glass plates 1 is 0.5 to 4.0 MPa.

While the above description includes reference numbers for expediency of comparison to the drawings, such inclusion does not limit the present invention to the constructions shown in the accompanying drawings.

BRIEF DESCRIPTION OF THE DRAWINGS

FIG. 6 is a sectional view of a principal portion of a glass panel according to a second embodiment;

FIG. 7 is an explanatory view showing the prior art;

BEST MODE FOR CARRYING OUT THE INVENTION

Embodiments of the present invention will be described hereinafter with reference to the drawings.

[First Embodiment]

Figure 1:
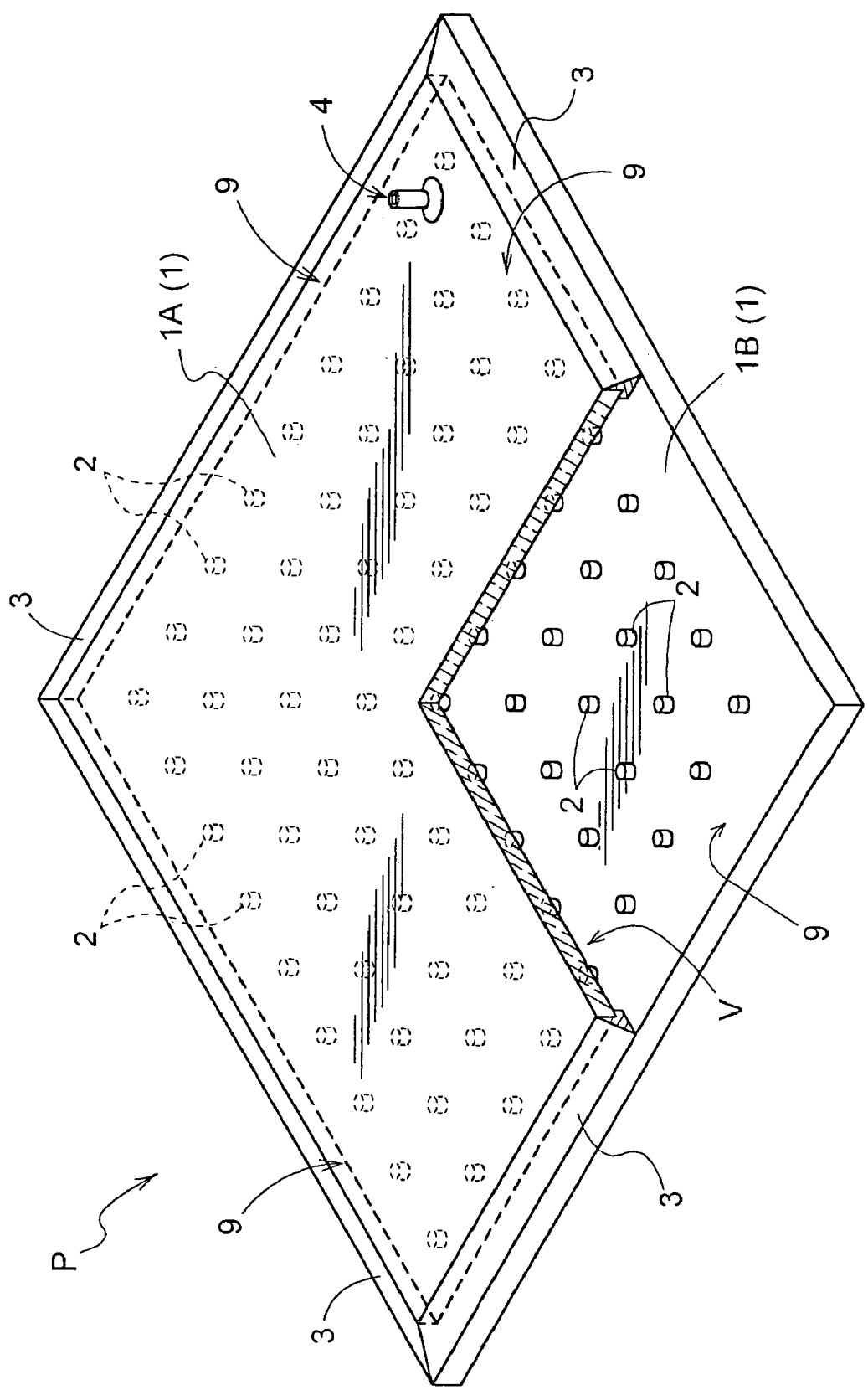
FIG. 1 is a partly cut away perspective view of a glass panel.

FIG. 1 shows a glass panel P in one embodiment of the present invention. The glass panel P comprises a pair of glass plates I (1A, 1B) opposed to each other, a plurality of spacers 2 disposed between the glass plates and spaced from each other along plate surfaces for maintaining a gap between the glass plates, and low melting point glass 3 such as solder glass of low gas permeability acting as a sealing member having a lower melting point than the glass plates 1 for sealing the glass plates 1 along the entire circumference at outer peripheries 9 thereof to define a decompression void V between the pair of glass plates 1A and 113. At outer surfaces of the outer peripheries 9 adjacent where the glass plates 1A and 1B are sealed to each other through the low melting point glass (sealing member) 3 remains a compressive force Fc of approximately 0.5 to 4.0 MPa with the decompression void V being under at normal pressure (atmospheric pressure).

The glass plates IA and 1B in this embodiment are in the form of transparent float sheet glass about 3 mm thick. One of the glass plates 1A includes a suction portion 4 used for suctioning and decompressing the decompression void V.

Figure 2:
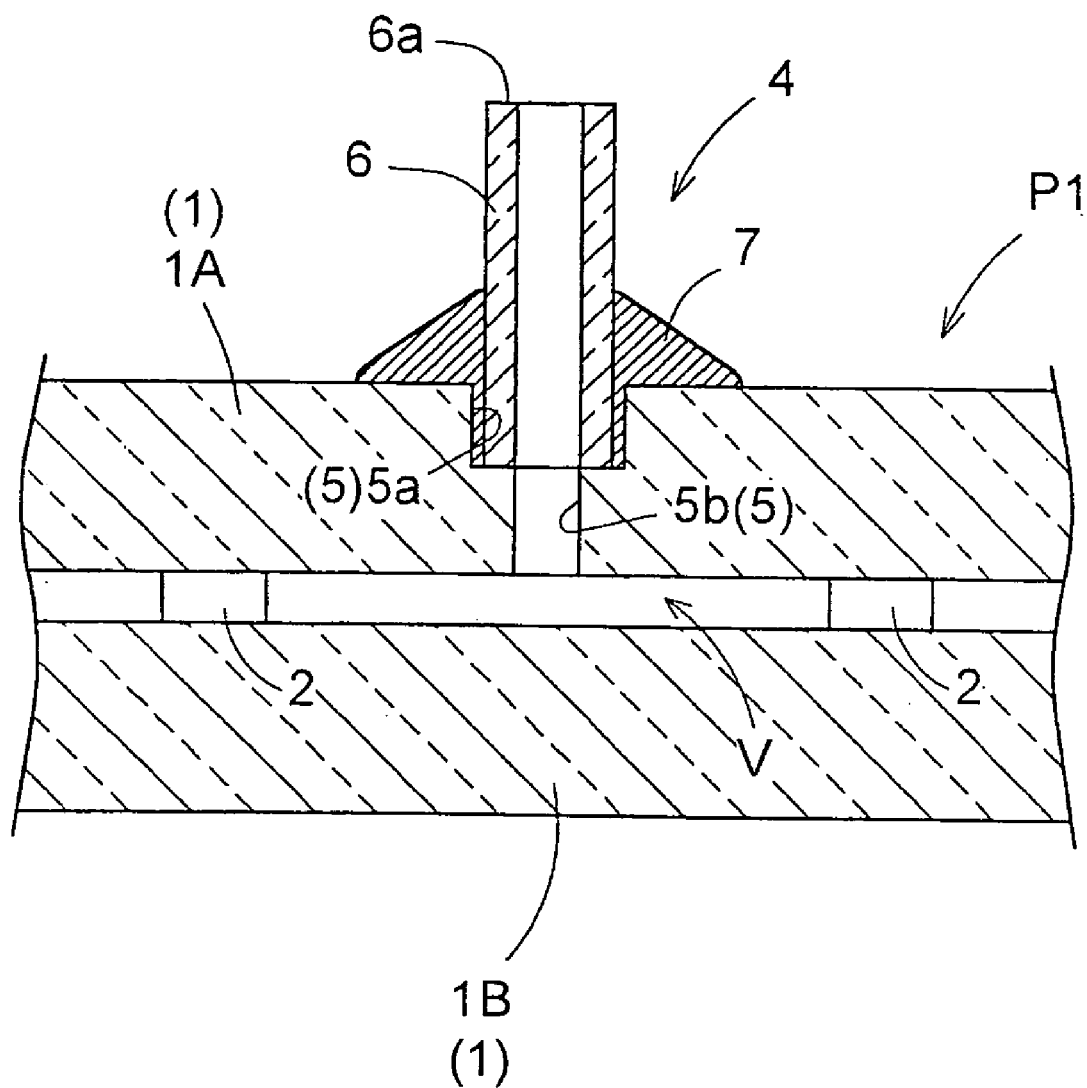
FIG. 2 is a sectional view of a principal portion of the glass panel.

As shown in FIG. 2, the suction portion 4 includes a stepped perforation 5 formed in one of the glass plates 1A to communicate with the void V, and consisting of a large bore 5a of approximately 3 mm in diameter and a small bore 5b of approximately 2 mm in diameter. A glass tube 6 is mounted in the large bore 5a to be normal to the plate surface, and low melting point glass 7 is applied to join and fix peripheral surfaces of the perforation 5 and the glass tube 6 in a gastight condition.

The spacers 2 are made of a material having a compressive strength of at least $5 \times 10^3$ kgf/cm² (approximately $4.9 \times 10^4$ N/cm²), e.g. stainless steel (SUS304), and preferably have a cylindrical configuration of about 0.3 mm to 1.0 mm in diameter and about 0.15 mm. to 1.0 mm in height. Preferably, the spacers 2 are arranged at intervals of about 20 mm.

One of the glass plates 1A has a slightly smaller area than the other glass plates 1B, and the outer peripheries of the other glass plate 1B protrude from the outer peripheries of the one glass plate 1A throughout the circumference thereof. Thus, in sealing the outer peripheries of the glass plates 1 with the low melting point glass 3, a paste-like low melting point glass material 8 may be placed on the protruding portions to form the void V efficiently.

Figure 3:
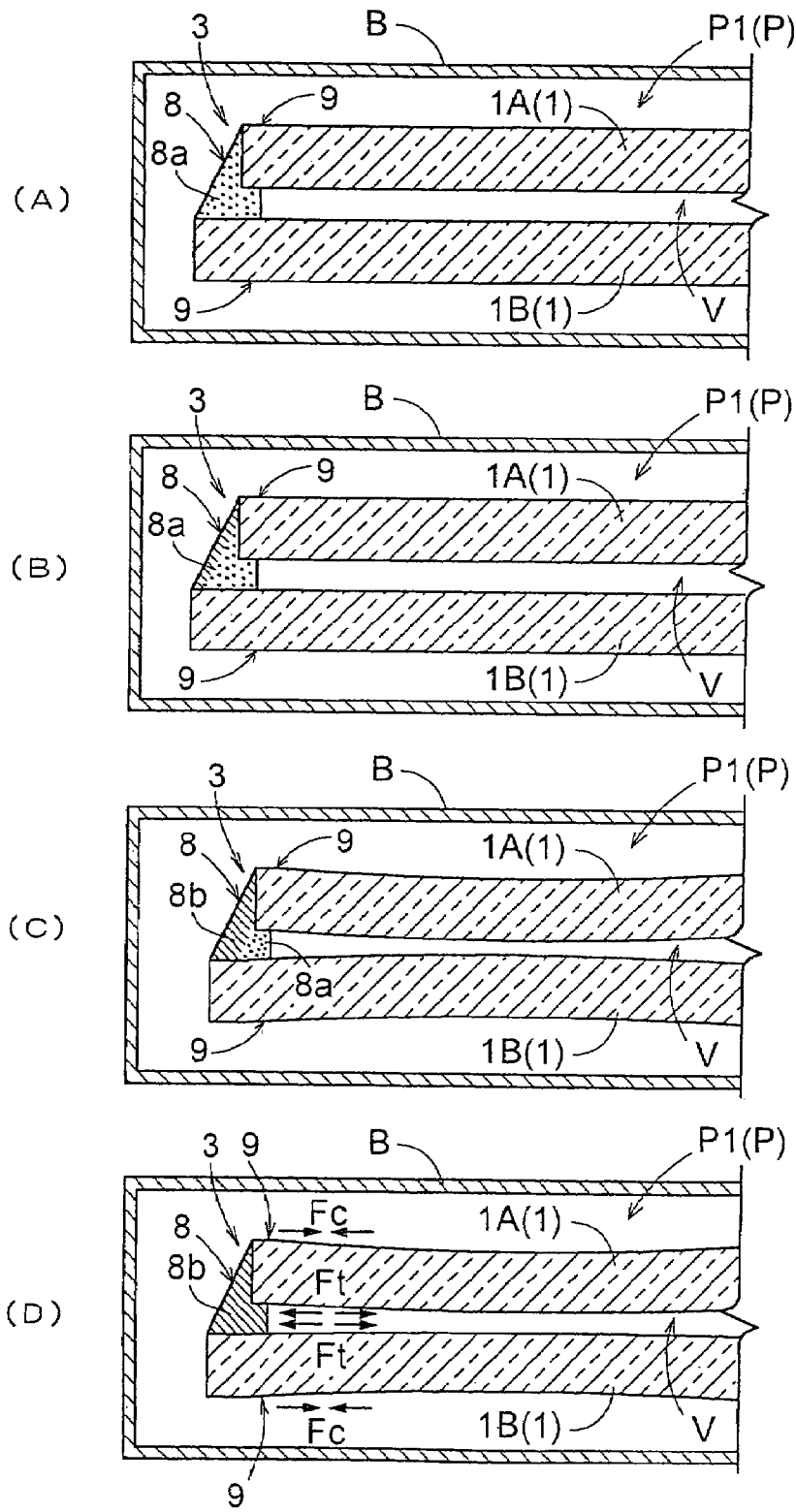
FIG. 3 is an explanatory view schematically showing a method of manufacturing the glass panel.

A method of manufacturing the glass panel P will be described with reference to the schematic view shown in. FIG. 3, which glass panel has the compressive force Fc remaining at the outer surfaces of the outer peripheries 9 of the glass plates 1A and 1B adjacent where the glass plates IA and 1B are sealed to each other by the low melting point glass (sealing member) 3, with the decompression void V being at atmospheric pressure.

The spacers 2 are disposed between the glass plates 1A and 1B, with one of the glass plates IA placed on top. The paste-like low melting point glass material 8 is applied along the outer peripheries of one of the glass plates IA. The low melting point glass material 8 is applied over the peripheral surface of the perforation 5 and the glass tube 6 to complete a glass assembly P1. As shown in FIG. 3(A), the entire glass assembly P1 is heated in a furnace B to approximately 500° C. to melt the low melting point glass material 8.

Next, as illustrated in FIG. 2 and. FIGS. 3(B) to 3(D), the glass assembly P1 is cooled by lowering the temperature within the furnace B to around room temperature at a temperature drop rate of approximately 10 to 20° C./min. Then, the glass plates 1A and 1B are sealed to each other at the outer peripheries thereof by the hardened low melting point glass 3 to form the decompression void V, and the peripheral surface of the perforation 5 and the glass tube 6 joined gastight by the hardened low melting point glass 7. This completes the manufacture of the glass panel P.

In the process of cooling the glass assembly PI to around room temperature to manufacture the glass panel P, the compressive force Fc is allowed to remain at the outer surfaces of the outer peripheries of the glass plates 1A and 1B.

More particularly, as shown in FIG. 3(A), the entire glass assembly P1 is expanded when the low melting point glass material 8 is melted by heating the entire glass assembly P1, and then starts to contract in a direction. along the plate surface as the temperature falls within the furnace B. At this stage, as shown in FIGS. 3(B) and 3(C), when a condition is created in which the temperature fall occurs at surfaces of the glass assembly P1 opposed to the furnace B earlier than at the surfaces opposed to the inner void V, the low melting point glass material 8 starts to harden at an outer surface thereof, while the respective glass plates IA and 1B start to contract in the direction of the plate surface first at the outer surfaces thereof.

Various concrete methods are conceivable in order to establish such a condition. These include, for example, controlling temperature increase and decrease by using an infrared heater as a heating element for the furnace B having a. wavelength of 5 microns or more as a principal component that is not easily transmitted through the glass plates 1A and 1B. Alternatively, heat exchange may be expedited by using a high-speed forced airflow at a controlled temperature to provide an increased coefficient of heat transfer between the atmosphere within the furnace and the surfaces of the glass plates.

Of the low melting point glass material 8, a portion hatched with dots 8a denotes an unhardened portion while a portion hatched with obliques 8b denotes a hardened portion.

As a result, the contraction of each glass plate IA or 1B in the direction of the plate surface proceeds inwardly of the glass plate with a further fall in the temperature within the furnace B. The hardening of the low melting point glass material 8 also proceeds inwardly thereof. As shown in FIG. 3(C), the contraction of each glass plate IA or IB in the direction of the plate surface proceeds inwardly of the glass plate in a state that the glass plates IA and IB are bound at the outer peripheries thereof by the hardened low melting point glass material 8 (8b) and that the temperature fall of each, glass plate IA or 1B at the inner surface thereof is small and thus the contraction of the glass plate in. the direction of the plate surface is also small. Therefore, while the entire glass assembly P1 is contracted, portions between the spacers 2 of the glass plates IA and 1B as well as portions between the hardened low melting point glass material 8 and the spacers 2 gradually become curved and concaved.

As shown in FIG. 3(D), when the temperature of each of the glass plates IA and IB is lowered at the inner surface thereof to increase the contraction in the direction along the plate surface, the entire low melting point glass material 8 has hardened to strongly bind the relative posture of the glass plates IA and IB at the outer peripheries to prevent the inner surfaces thereof from freely contracting. As a result, a tensile force Ft is exerted on the inner surface of each of the glass plates IA and 1B, while the compressive force Fe is exerted on the outer surface thereof. The tensile force Ft remains at the inner surface of the outer peripheries of each of the glass plates IA and IB, while the compressive force Fc remains at the outer surface of the outer peripheries of each of the glass plates IA and IB, even after the glass panel P is manufactured by cooling the glass assembly P1 to around room temperature.

Next, a method of manufacturing what is known as a vacuum double glazing having the decompression void V of the glass panel P suctioned and maintained in the decompressed condition will be described.

Figure 4:
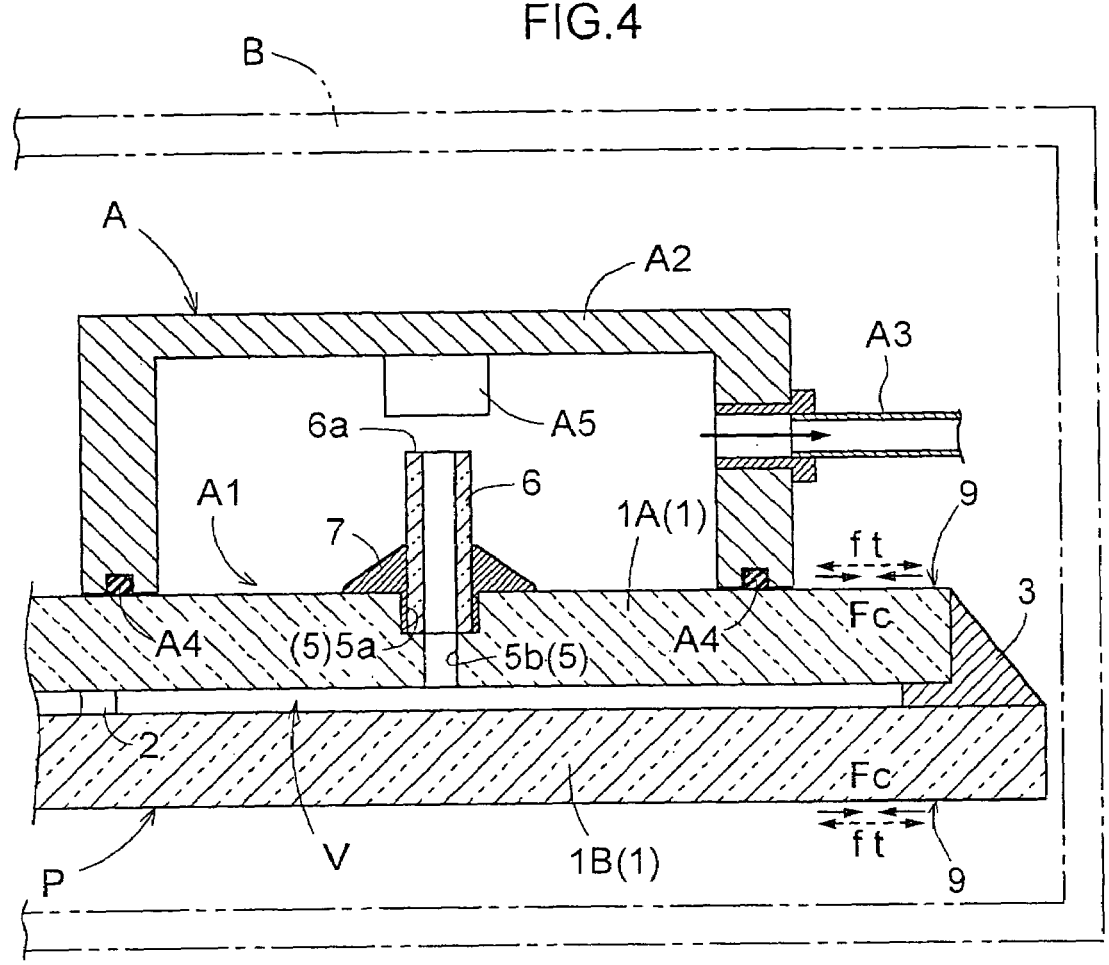
FIG. 4 is an explanatory view showing a method of decompressing a decompression void.

As shown in FIG. 4, the glass panel P is horizontally supported within the furnace B with the glass plate IA being placed at the upper side. A suction cup A2 of a suction-sealing device A is placed on the surface of the glass plate 1A for enclosing the glass tube 6.

The suction-sealing device A includes the suction cup A2 in the form of a bottomed cylinder defining a suction opening A1, a flexible pipe A3 connected to and communicating with the suction cup A2 at a lateral side portion thereof for drawing and exhausting the gas from the decompression void V, an elastic O-ring A4 provided at a forward end of the suction cup A2 for sealing the surface of the glass plate 1A, and an electric heater A5 provided. inside the bottom of the suction cup A2 for heating and. melting a distal end portion 6a of the glass tube 6.

The forward end of suction cup A2 is placed in tight contact with the surface of the glass plate IA through the O-ring A4. The interior of the decompression void V is activated by heating it to about 200° C., for example. At the same time, the gas is drawn and exhausted from the decompression void V through the flexible pipe A3, thereby to decompress the decompression void V to $1.0 \times 10^{-2}$ Torr (approximately 1.33 Pa) or less.

Figure 5:
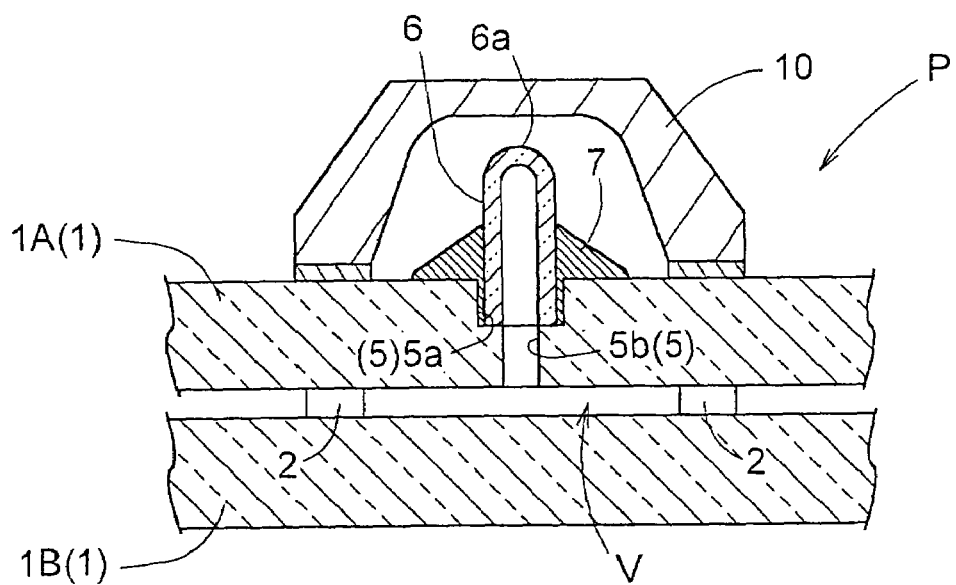
FIG. 5 is a sectional view of a principal portion of the glass panel.

Then, the distal end portion 6a of the glass tube 6 is locally heated (to approximately 1000° C.) by the electric heater 5 and melted to seal. the perforation 5 as shown in FIG. 5. After a cooling operation is effected in this state, a protection cap 10 is adhered to the glass plate 1A for covering the melted glass tube 6.

Incidentally, the glass plates 1 are deflected toward the decompression void V by the pressure difference between the pressure within the decompression void V and atmospheric pressure as the decompression void V is decompressed. In the absence of the compressive force Fc remaining at the outer surfaces of the outer peripheries 9 of the glass plates 1A and 1B, a tensile force ft of approximately 4.0 to 8.0 MPa would act on the outer surfaces of the outer peripheries 9 of the glass plates 1. According to this embodiment, however, the compressive force Fc of approximately 0.5 to 4.0 MPa remains at the outer surfaces of the outer peripheries 9 of the glass plates 1, thereby to reduce the tensile force (ft−Fc) actually remaining at the outer surfaces of the outer peripheries of the glass plates 1.

[Second Embodiment)

It is possible to modify the glass panel P having the compression force Fe remaining at the outer surface of the outer peripheries of each glass plate 1A or 1B adjacent where the glass plates are sealed by the low melting point glass (sealing member) 3 with the decompression void V at atmospheric pressure. As illustrated in FIG. 6, the glass plates IA and 1B of the glass panel P may be arranged parallel or substantially parallel to each other across the decompression void V to be sealed with each other at the outer peripheries 9 thereof through the low melting point glass (sealing member) 3, allowing the compressive force Fe to remain at the outer surfaces of the outer peripheries 9 adjacent the sealed portions. To this end, it is effective to maintain the pair of glass plates IA and 1B in parallel by clipping the outer peripheries 9 of the plates at appropriate intervals, or to place a plate-like weight on the surface of the upper glass plate 1.A.

The glass panel P of the present invention is not limited to the glass plates IA and 1B which are different in length and in width, but may employ glass plates of the same size. The glass plates 1A and 1B may be arranged one over the other to have the outer peripheries 9 flushed with each other.

The spacers 2 used in the glass panel P of the present invention are not necessarily made of stainless steel, but may be made of various materials, e.g. Inconel 718 alloy or other metallic materials, silica glass, ceramics and so on. Each spacer 2 is not necessarily the cylindrical shape, but may be of prismatic shape or the like. The intervals between the spacers 2 may also be varied as appropriate.

The glass plates 1 of the glass panel P in the present invention may be sealed at the outer peripheries thereof through a metallic solder serving as the sealing member 3 which includes indium, lead, tin or zinc as a principal constituent.

[Alternative Embodiment 1]

In forming the glass panel P by arranging the pair of glass plates I cut by a cutter to be opposed to each other, the directions of cut portions have not been determined in use since this does not significantly affect the properties, e.g. a thermal insulation performance, of the glass panel P.

When the glass plates 1 are subjected to a load from the outside such as a wind pressure or impact, a bending moment acts on the glass plates 1. However, since the glass plates 1 are rigidly joined to each other at the outer peripheries 9 thereof by the sealing member, the two glass plates 1A and 1B combine to cope with the load as if a single glass plate. Therefore, a tensile stress occurs on the outer surfaces at the outer peripheries exposed to the atmosphere of one of the glass plates 1A, while a compressive stress occurs on the outer surfaces at the outer peripheries exposed to the atmosphere of the other glass plate 1B. In addition, a stress neutral axis acting against the load is generated between the glass plates 1A and .1B. Consequently, the stronger stress is exerted on the outer surfaces of the outer peripheries exposed to the atmosphere of the glass plates 1A and 1B, the farther away they are from the stress neutral axis, compared with the outer peripheries adjacent to the decompression void V positioned closer to the stress neutral axis. When the cut portions of each of the glass plates are located at the outer surfaces of the outer peripheries exposed to the atmosphere where the tensile stress is exerted, fine cracks formed in the cut portions are pulled by the strong tensile stress, thereby tending to be developed to increase the risk of damaging the glass.

Thus, where the directions of the cut portions are not determined for use, the glass panel easily breaks depending on their arrangement (where the cut portions are exposed to the atmosphere) One of the objects of the present invention is to provide a glass panel which is not easily broken by restraining the risk of damaging the glass panel due to a load such as a wind pressure or impact applied from outside in order to overcome the above-noted disadvantage. The construction of such a glass panel will be described below.

Figure 8:
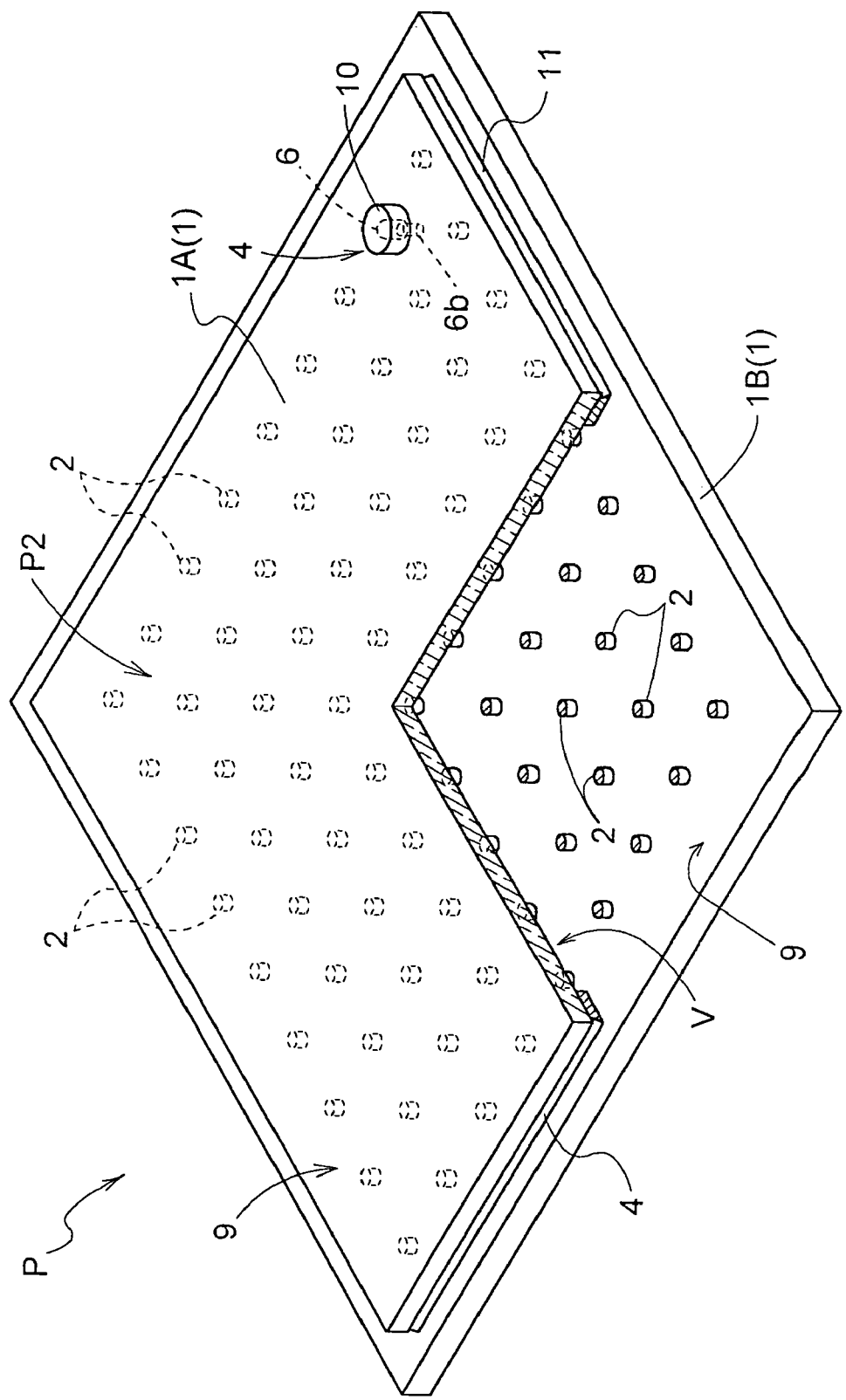
FIG. 8 is a partly cut away perspective view showing one example of glass panels according to Alternative Embodiment 1.
Figure 9:
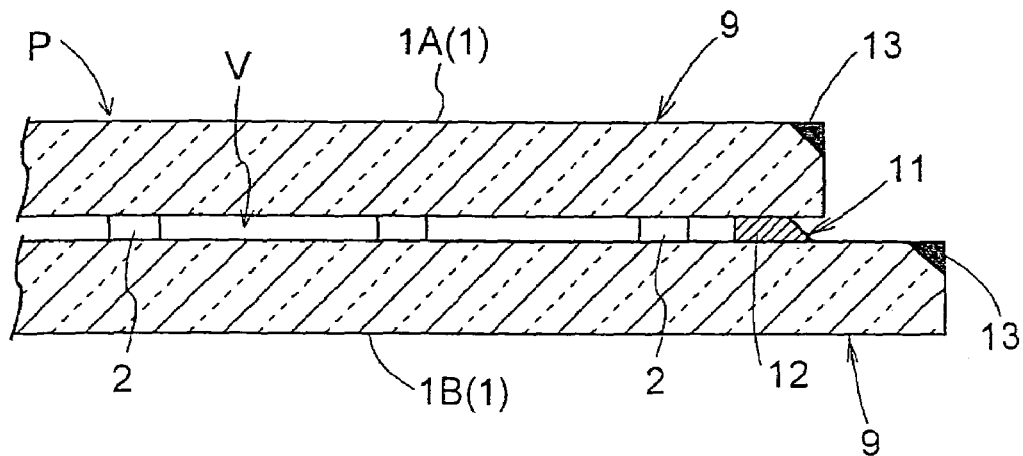
FIG. 9 is a sectional view of a principal portion of the glass panel according to Alternative Embodiment 1.

FIGS. 8 and 9 show a vacuum double glazing P exemplifying glass panels according to the present invention. The vacuum double glazing P includes a vacuum double glazing body P2 having a pair of glass plates IA and 1B cut by a cutter, a plurality of spacers 2 arranged between the glass plates 1A and iB at intervals along the plate surfaces, a sealing member 11 for adhering the glass plates IA and 1B at outer surfaces of the outer peripheries thereof, and a suction member 4 mounted on one of the glass plates IA for decompressing and sealing a decompression void V. The vacuum double glazing body P2 is in a sealed condition by drawing air from the decompression void V through the suction member 4.

Figure 10:
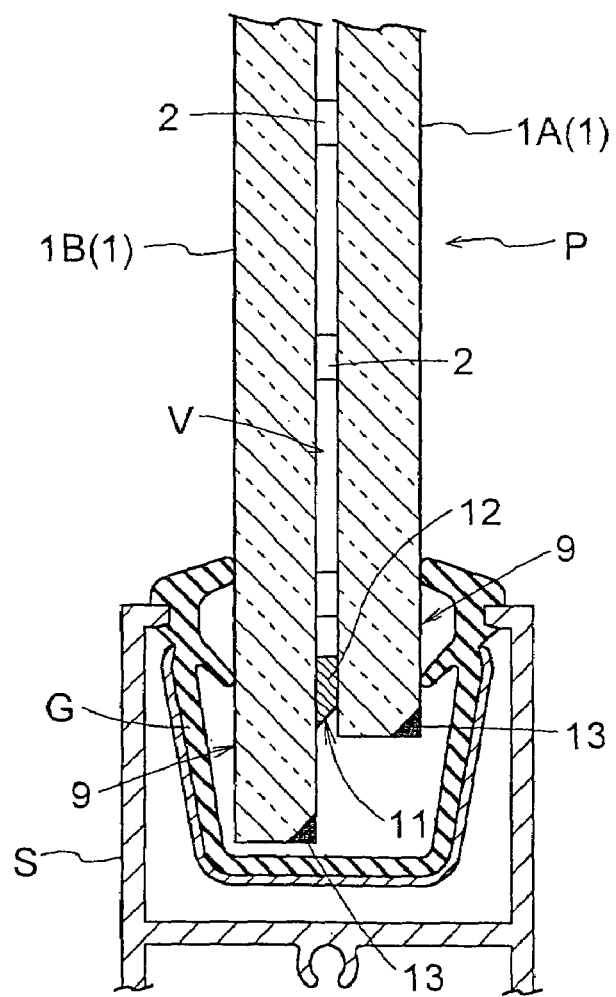
FIG. 10 is a sectional view of a principal portion showing the glass panel in use according to Alternative Embodiment 1.

FIG. 10 shows the vacuum double glazing P in use.

The vacuum double glazing P includes elastic glazing channels G having a U-shaped section fitted thereto along the entire outer surfaces of the outer peripheries 9 thereof. The vacuum double glazing P is fitted in grooves of a sash S through the glazing channels G.

One of the glass plates 1A and the other off the glass plates 113 are both formed of float glass plate (2.65 mm to 3.2 mm thick). The outer surfaces of the outer peripheries 9 of the glass plates 1A and 1B are arranged such that the outer glass plate 1B protrudes along the directions plate surface. Sealing low melting point glass 12 (one example of the sealing member 11) is applied and sintered between the outer surfaces of the outer peripheries 9 of the glass plates IA and IB, thereby to reliably seal outer peripheries of the decompression void V.

Preferably, the spacers 2 are made of a material having a compressive strength of $4.9 \times (10^8)$ Pa [5 t/cm$^2$] or more, and are formed of Inconel 718 alloy in this embodiment. With a lower strength, the spacers 2 could be broken under atmospheric pressure acting on the glass plates 1, making formation of the decompression void V impossible. As a result, the glass plates 1 could directly contact each other to decrease the thermal insulation performance or damage the glass plates 1.

The spacers 2 are formed to have a cylindrical configuration 0.3 mm to 1.0 mm in diameter and 0.15 mm in height (corresponding to the diameter of the spacer). Such a cylindrical configuration can reduce the chance of creating corners tending to undergo stress concentrations in positions contacting the glass plates 1A and 1B. Thus, the glass plates 1 are gently supported. and prevented from. being easily damaged.

The spacers 2 are arranged at intervals of 20 mm longitudinaly and transversely along the plate surface.

As shown in FIG. 8, the suction member 4 includes a suction opening 6b formed in one of the glass plates 1A, a suction glass tube 6 fixed to the suction opening 6b, and a protection cap 10 for covering the suction opening 6b and the glass tube 6 from above. After the glass tube 6 is heated and completely sealed at a distal end thereof while the gas is sucked from the decompression void V through the glass tube 6, the cap 10 is placed over the glass tube.

The decompression void V is in a decompressed condition, for example, of 1.33 Pa (corresponding to 0.01 Torr) or less by suctioning and decompressing through the suction member 4.

With reference to FIG. 9, the cut portions 13 on the outer surfaces of the outer peripheries 9 of the glass plate 1B of the pair of glass plates 1A and 1B which have been cut by the cutter are directed toward the decompression void V.

This is done for the following reason. A bending moment is exerted on the glass plate 1A undergoing an external load such as a wind pressure or impact. The glass plate 1A is rigidly fixed to the other glass plate 1B at the outer peripheries 9 thereof by the sealing member 11. The two glass plates IA and 1B combine to cope with the load as if a single glass plate. Therefore, a tensile stress occurs on the outer surfaces at the outer peripheries exposed to the atmosphere of one of the glass plates 1A, while a compressive stress occurs on the outer surfaces at the outer peripheries exposed to the atmosphere of the other glass plate 1B. In addition, a stress neutral axis acting against the load is generated between the glass plates IA and 1B. Consequently, the stronger stress is exerted on the outer surfaces of the outer peripheries exposed to the atmosphere of the glass plates IA and, 1B, the farther away they are from the stress neutral axis, compared with the outer peripheries adjacent to the decompression void V positioned closer to the stress neutral axis.

When the cut portions 13 of each of the glass plates are located at the outer surfaces of the outer peripheries exposed to the atmosphere where the strong tensile stress is exerted, fine cracks formed in the cut portions 13 are pulled by the strong tensile stress, thereby tending to be developed to increase the risk of damaging the glass.

Each of the glass plates is cut by developing a crack formed by flawing the surface of the glass plate by a cutter such as a diamond cutter or a wheel cutter. The cut portions 13 herein refer to the flawed portions formed in the surface of the cut glass plate.

With the construction in which the cut portions 13 of at least one of the glass plates 1B is directed toward the decompression void V as shown in FIGS. 9 and 10, it is possible to restrain the risk of damaging the glass due to development of the cracks because the tensile stress exerted on the cutting potions 13 of the glass plate 1B is weak, compared with the construction in which the cut portions 13 of both of the glass plates IA. and 1B are exposed to the atmosphere.

Figure 11:
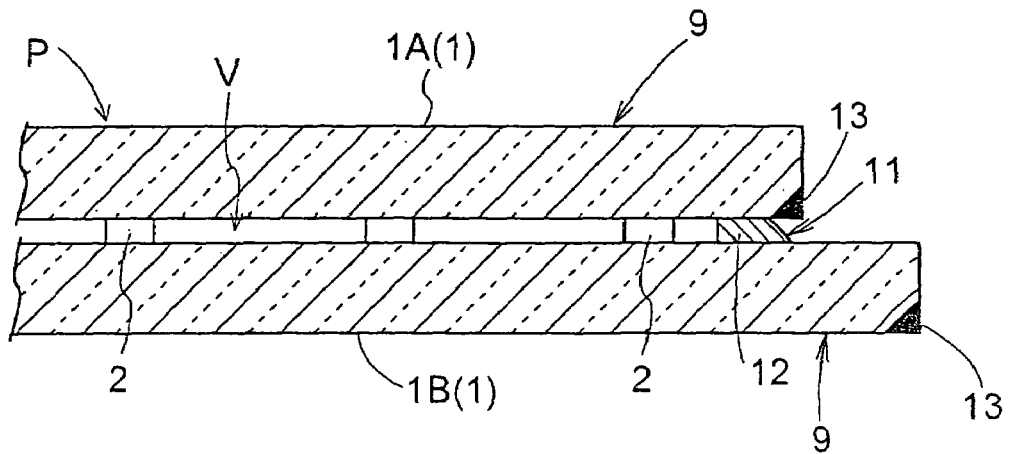
FIG. 11 is a sectional view of a principal portion of a glass panel according to another mode of Alternative Embodiment 1.

With a construction in which the cut portions 13 of the glass plate IA are directed toward the decompression void V as illustrated in FIG. 11, the tensile stress exerted on the cut portion 13 of the glass plate IA is weak, and thus it is possible to restrain the risk of damaging the glass due to development of the cracks, compared with the construction in. which the cut portions 1.3 of both of the glass plates IA and 1B are exposed. to the atmosphere as described above.

Figure 12:
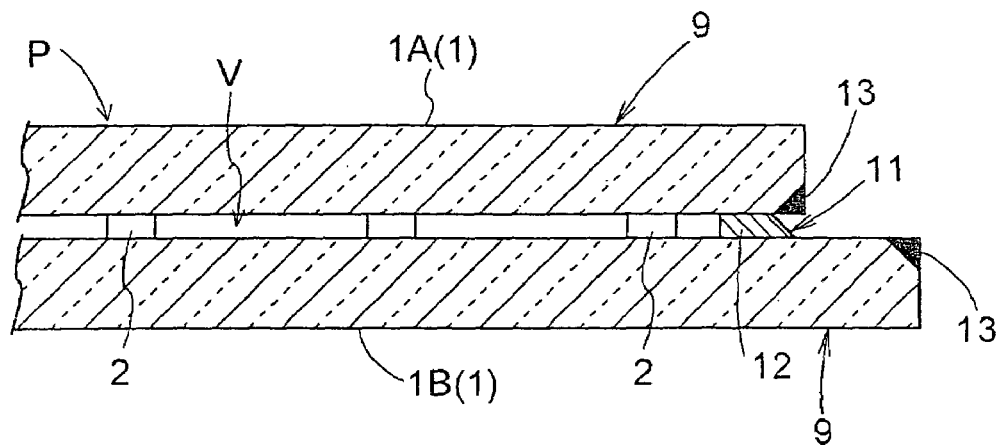
FIG. 12 is a sectional view of a principal portion of a. glass panel according to a further mode of Alternative Embodiment 1.

Further, the cut portions 13 of both of the glass plates 1A and 1B cut by the cutter may be directed toward the decompression void V as shown in FIG. 12. With this construction, it is possible to prevent the glass from damaging due to development of the cracks formed in or a direct load acting on the cut portions 13 of the respective glass plates 1A and 1B, thereby to improve the strength of the glass against the load applied from outside.

Figure 13:
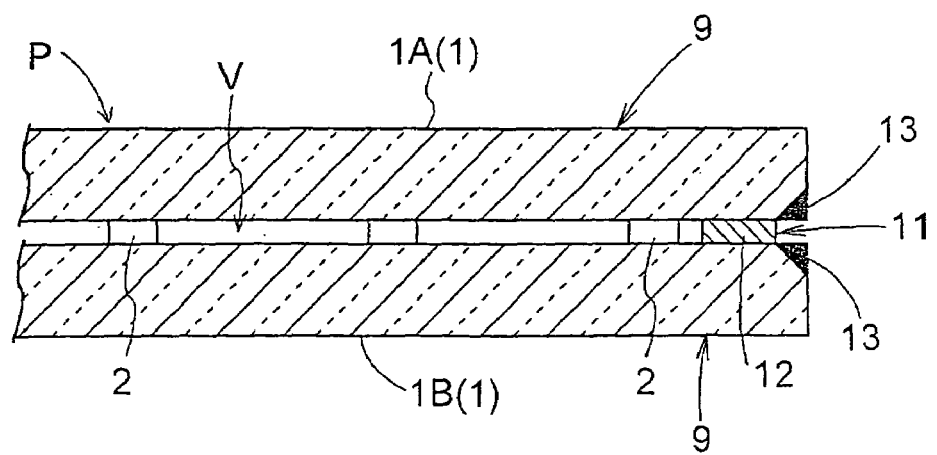
FIG. 13 is a sectional view of a principal portion of a glass panel according to a further mode of Alternative Embodiment 1.

The glass panel according to the present invention is not limited to the above embodiments in which the other glass plate 113 protrude along the plate surface, but is applicable also to a construction as shown in FIG. 13 in which the outer peripheries 9 of both of the glass plates 1A and 113 protrude by the same amount.

Figure 14:
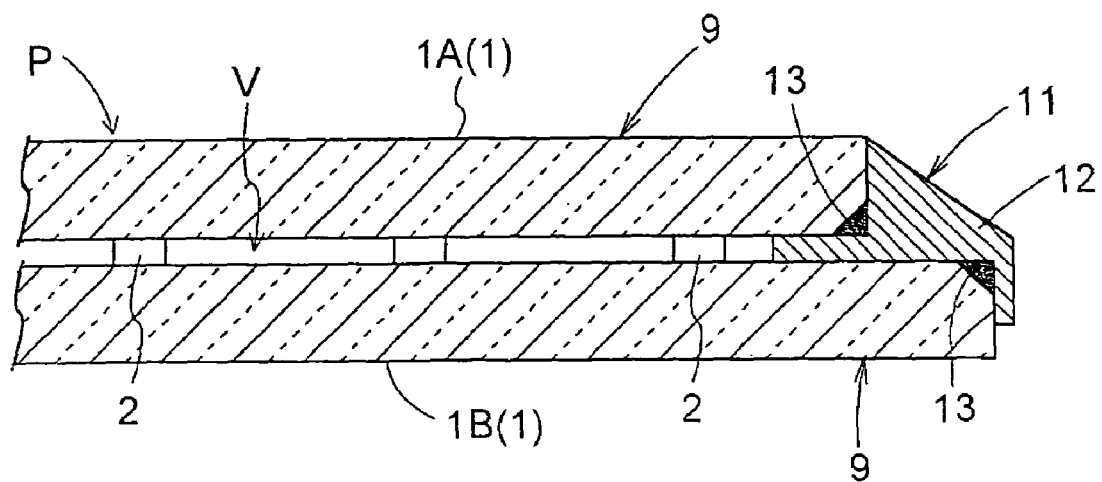
FIG. 14 is a sectional view of a principal portion of a glass panel according to a further mode of Alternative Embodiment 1.

The sealing member 11 is not limited to the one described in the above embodiments, which is applied and sintered between the outer peripheries of the glass plates 1A and 1B for sealing the outer peripheries of the decompression void V. Instead, as shown in FIG. 14, the sealing member 11 may cover the cut portions 13.

The fine cracks generated in the cut portions 1.3 are unstable with high activity compared with other parts of the glass surfaces. Thus, as the cracks are constantly exposed to the ambient air, the Si—O bonds in the glass surfaces are broken by a reaction to water (H2O) present in the air to destroy the glass structure and further develop the cracks to cause the risk of damaging the glass. According to the construction noted above, the sealing member 11 covers the cut portions 13 thereby to minimize the chance of contacting water (H2O) in the air and prevent the Si—O bonds in the glass surfaces from being easily broken, as a result of which development of the cracks can be checked.

Further, the glass strength against the load applied from outside may be also improved with the construction in which the cut portions 13 of the respective glass plates 1A and 1B are directed toward. the decompression void V.

Figure 15:
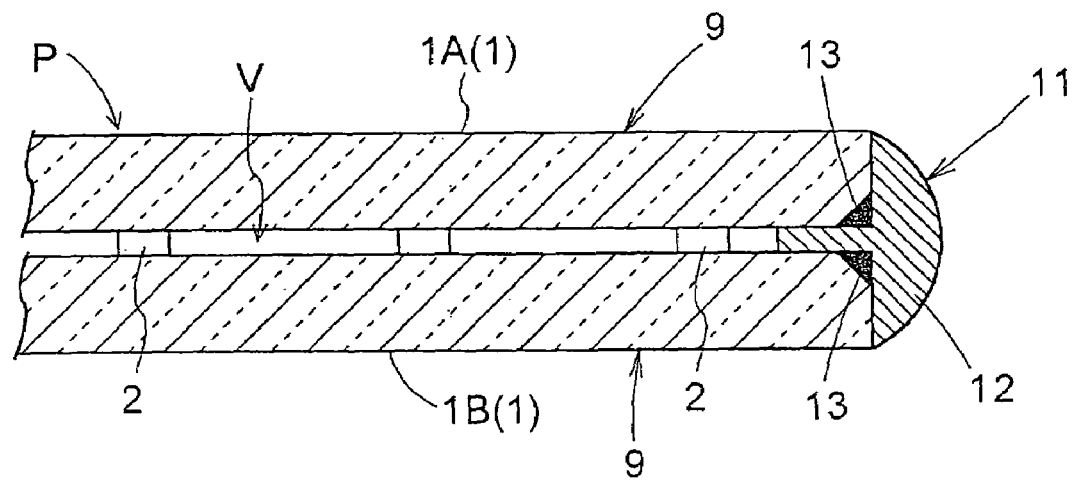
FIG. 15 is a sectional view of a principal portion of a glass panel according to a further mode of Alternative Embodiment 1.

This measure may be applied also to a construction as shown in FIG. 15 in which the outer peripheries of both of the glass plates 1A and 1B protrude by the same amount.

In addition to the construction described above, it is possible to apply an overcoat to the cut portions 13 and sealing member 11 with an organic material such as a resin or the like to prevent them from contacting water in the air.

The sealing member is not limited to the one made of low melting point glass as noted above, but may be made of a highly rigid material such as a metallic solder, epoxy resin or the like.

A construction may be employed to have the stress neutral axis located within the wall thickness of one of the glass plates, for example. Further, the cut portions of one of the glass plates may be located on the stress neutral axis. With this construction, stress is not exerted on the cut portions, and thus the risk of damaging the glass due to development of the cracks may be avoided.

[Alternative Embodiment 2]

The pair of glass plates 1A and 1B are formed. by cutting glass to desired sizes by a cutter, and then used as they are to constitute the glass panel. Such a glass panel may be used for windowpanes of buildings and windshields of automobiles and railway carriages. In such use, external loads such as wind pressure and impact are frequently applied to the glass plates, and a bending moment is exerted on the glass plates subjected to the loads.

In this state, as described in Alternative Embodiment 1, the greater stress is exerted on the surfaces of the outer peripheries of the glass plates 1A and 1E exposed to the atmosphere, the farther away they are from the stress neutral axis, compared with the surfaces of the outer peripheries directed toward to the decompression void V which are positioned closer to the stress neutral axis.

Figure 16:
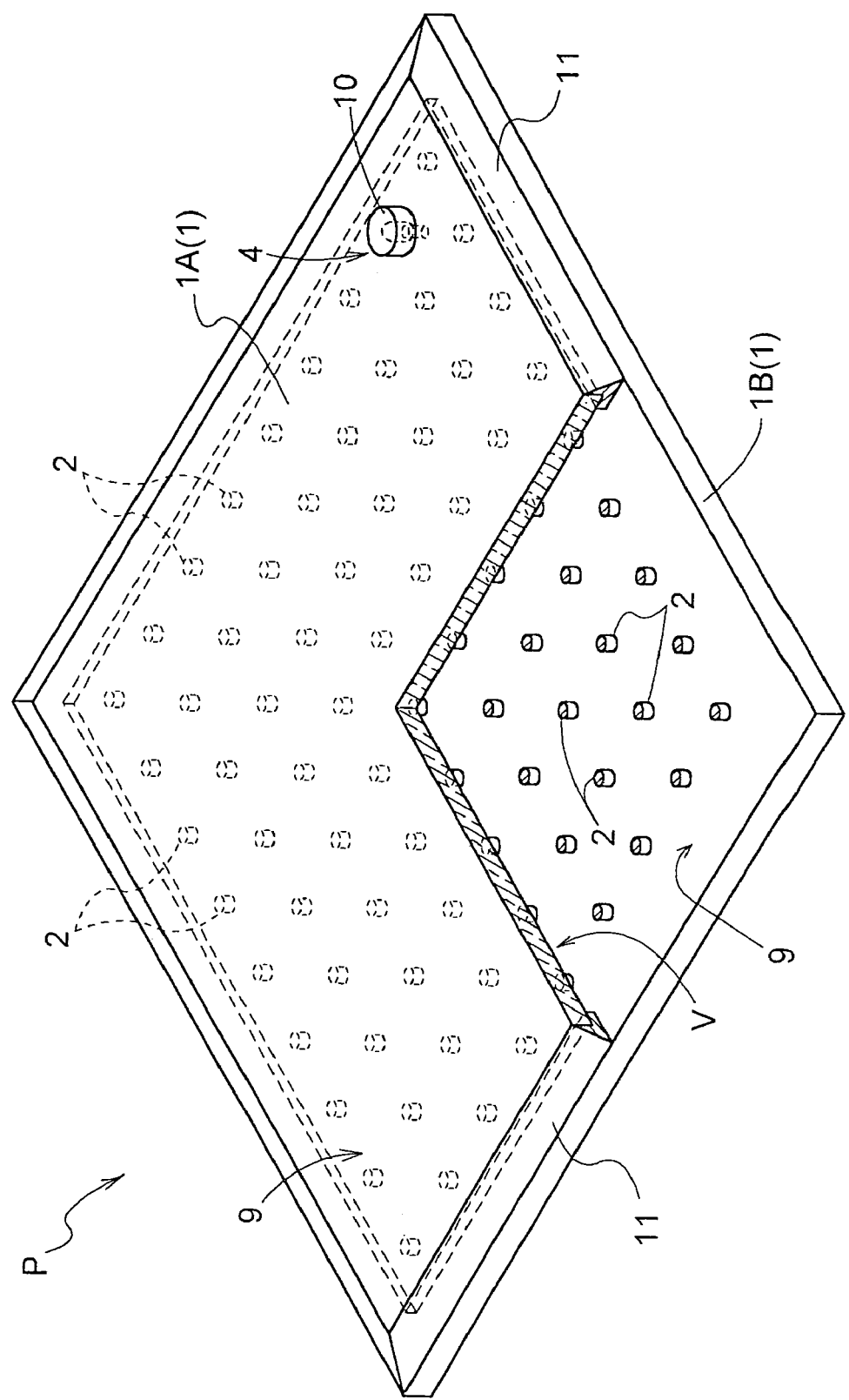
FIG. 16 is a partly cut away perspective view of a vacuum double-glazing according to Alternative Embodiment 2.

However, where the glass plates 1 cut by the cutter are used as they are, the fine cracks generated in a cutting operation may remain in the outer peripheries of the glass plates IA and 1B. Particularly where the cracks are generated around the outer peripheries exposed to the atmosphere where a strong tensile stress is exerted, the fine cracks are pulled by the strong tensile stress and thus, even though fine, are progressively developed to a cause of damage to the glass plates. One of the objects of the present invention is to provide a glass panel that can. restrain. the risk of damaging the glass due to external loads such as wind pressure and impact in order to solve the above-noted problem. The construction of such a glass panel will be described hereinafter, This type of glass panel includes a vacuum double glazing P. As shown in FIG. 16, the vacuum double glazing P has a pair of glass plates 1A and 1B formed by cutting glass by a diamond cutter, a wheel cutter or the like not shown.

A plurality of spacers 2 are disposed between opposite surfaces of the pair of glass plates 1A and 1B, thereby to define a decompression void V between the respective glass plates 1A and 1B. The glass plates 1A and 1B are rigidly adhered at outer peripheries thereof through scaling low melting point glass exemplifying a sealing member 11.

Each of the pair of glass plates 1A and 1B is formed of a float glass plate 2.65 mm to 3.2 mm thick. The glass plates 1A and 1B are slightly different in size. In the example shown in FIG. 16, the lower glass plate 1B is slightly larger than the upper glass plate and has outer peripheries protruding along the outer peripheries of the upper glass plate 1A.

The sealing low melting point glass as an example of the sealing member 11 is applied and sintered between the outer peripheries of the glass plates 1A and 1B by utilizing the protruding portions, thereby to rigidly adhere the glass plates 1A and 1B to each other at the outer peripheries thereof with the decompression void V being sealed at outer peripheries thereof between the opposite surfaces of the glass plates.

As described in Alternative Embodiment 1, the spacers 2 disposed between the glass plates 1A and 1B are formed of Inconel 718 to have a cylindrical configuration 0.3 mm to 1.0 mm in diameter and 0.15 mm in height (corresponding to the diameter of the spacer). Such a cylindrical configuration can reduce a chance of stress concentration in positions contacting the two glass plates 1A and 1B, thereby to gently support the glass plates 1A and 1B. The spacers are arranged at intervals of approximately 20 mm longitudinaly and transversely along the plate surface.

The decompression void V is maintained in a decompressed condition, for example, of 1.33 Pa (corresponding to 0.01 Torr) or less by sucking the gas from the decompression void V defined between the glass plates 1A. and 1B through a suction member 4 mounted on one of the glass plates 1A.

As described in Alternative Embodiment 1, the suction member 4 includes a suction opening and a suction glass tube. The gas is sucked from the decompression void V through the glass tube while the glass tube is heated and sealed at the distal end thereof, and then a protection cap 10 is placed over the glass tube.

Figure 17:
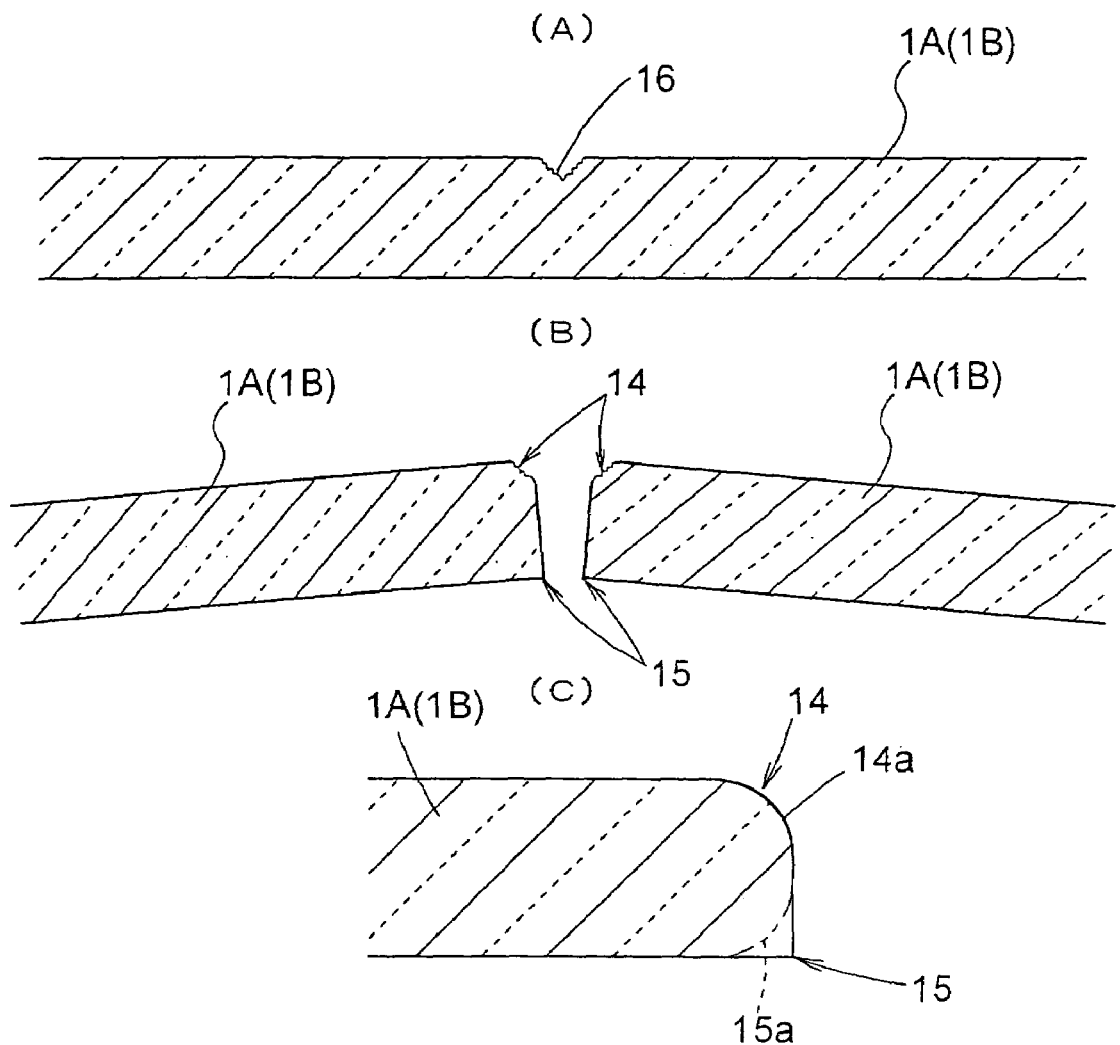
FIG. 17 is a sectional view showing a process of cutting a glass plate and a condition in which chamfered portions are formed according to Alternative Embodiment 2.

The pair of glass plates 1A and 1B are cut by the cutter as described above. More particularly, a crack 16 is created by the cutter on the glass surface as shown in FIG. 17(A), and developed therefrom to cut apart the glass as shown in FIG. 17(B). There exist fine cracks at cutting edge portions 14 adjacent to the crack and cutting edge portions 15 remote from the crack, more noticeably at the cutting edge portions 14.

Then, as shown in FIG. 17(C), at least the edge portions 14 are chamfered by grinding to form chamfers 1.4a to remove the fine cracks. It is required, through such a grinding treatment, that the surface roughness of the glass surface attains a flatness of 100 microns or less, preferably 20 microns or less, by Rmax (maximum difference between bulges and dimples of the glass surface). More particularly, a grinder having a. abrasive compound of a 150-mesh grain size or less is rotated to grind the edge portions 14 of the glass plates. Further, as shown in FIG. 18, the edge portions 14 chamfered as at 14a are located away from the decompression void V of the vacuum double glazing P to be exposed to the atmosphere, and then the glass plates 1A and 1B are adhered to each other through sealing low melting point glass 12.

In other words, in the pair of glass plates 1A and 1B constituting the vacuum double glazing P, the edge portions 14 disposed away from the decompression void V and exposed to the atmosphere are chamfered by grinding as at 1.4a.

Figure 18:
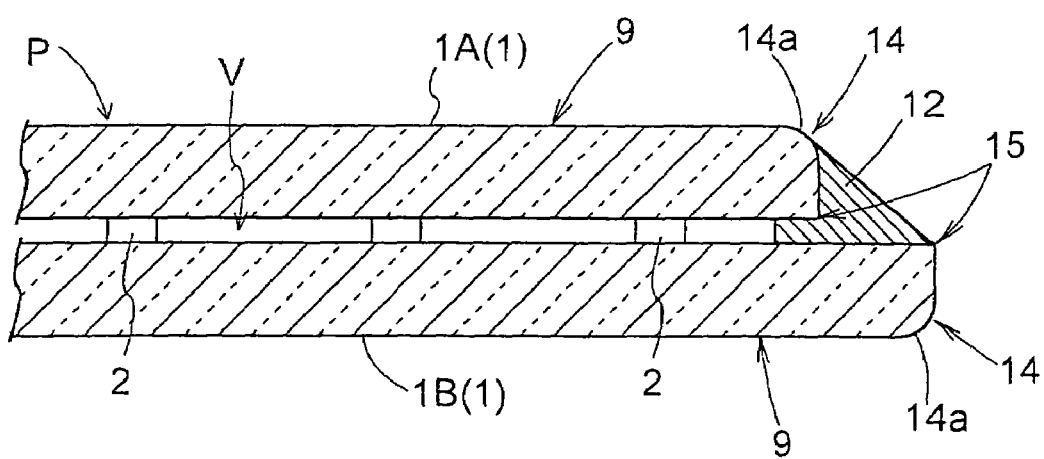
FIG. 18 is a sectional view of a principal portion of the vacuum double-glazing according to Alternative Embodiment 2.

In the embodiment shown in FIG. 18, it may be possible to chamfer the edge portions 14 exposed to the atmosphere of only one of the pair of glass plates 1A and 1B constituting the vacuum double glazing P, e.g. the glass plate 1B, to form the chamfers 14a.

Specifically, when an external load such as a wind pressure or impact is applied to the glass panel, a strong tensile tension occurs on the surfaces of the edge portions 14 exposed to the atmosphere of one of the pair of glass plates 1B, while a strong compressive tension is exerted on the surfaces of the edge portions 14 exposed to the atmosphere of the other of the pair of glass plates 1A. Development of the cracks is more noticeable where the tensile stress is exerted. For using this vacuum double glazing P for a windowpane of a building or a windshield of a vehicle, only the edge portions 14 exposed to the atmosphere where the tensile tension is exerted by wind pressure may be chamfered as at 14a, while the edge portions 14 exposed to the atmosphere where the compressive tension is exerted may not be chamfered.

Since the fine cracks are unstable with high activity compared with the other parts of the glass surface, the Si—O bonds at the crack portions may be broken by reaction to water (H2O) present in the air to destroy the glass structure, thereby to develop the cracks.

Thus, it is quite rational, when this vacuum double glazing is used for a windowpane as noted above, to form chamfers 14a by chamfering only the edge portions 14 exposed to the atmosphere of at least the glass plate 1B arranged to face outdoors to be subjected to rainwater or the like. In that case, the edge portions 14 exposed to the atmosphere of the indoor glass plate 1A may be coated with an organic material such as a resin or the like to prevent them from contacting water present in the air, if necessary.

Further, as shown in an imaginary line in FIG. 17(C), it is possible to chamfer the opposite edge portions 15 by grinding to form chamfers 15a in addition to the chamfers 14a of the edge portions 14.

Figure 19:
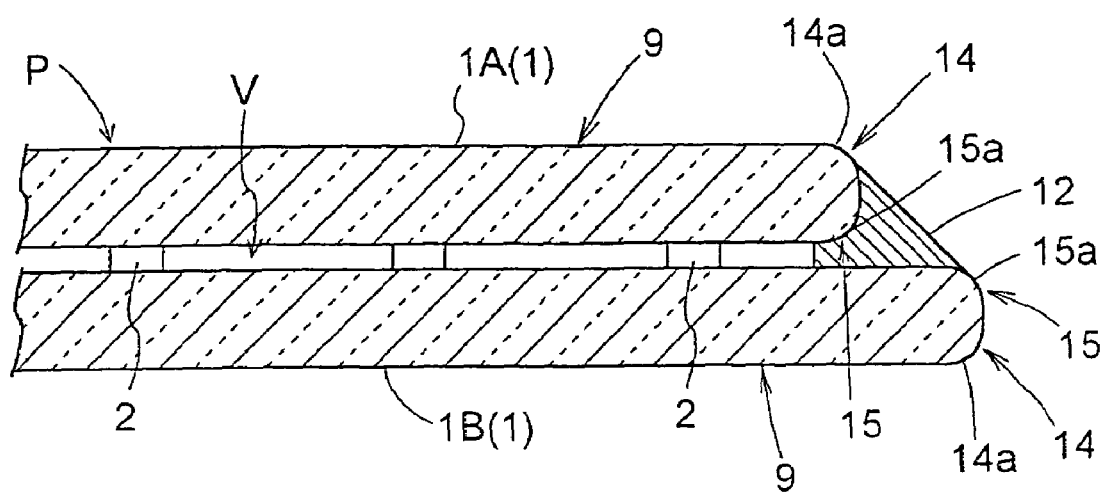
FIG. 19 is a sectional view of a principal portion of the vacuum double-glazing according to Alternative Embodiment 2.

Thus, as shown in FIG. 19, in the pair of glass plates 1A and 1B constituting the vacuum double glazing P, the respective edge portions 15 adjacent to the decompression void V are chamfered as at 15a by grinding in addition to the chamfers 14a of the respective edge portions 14 exposed to the atmosphere and opposite to the decompression void V.

In the foregoing embodiment, the outer peripheries of one of the glass plates 1B protrude from the outer peripheries of the other glass plate 1A, such that the sealing low melting point glass 1.2 may be applied and sintered by using these protruding portions. Instead, both glass plates 1A and 1B may have substantially the same size to have the outer peripheries thereof flushed with each other. The sealing low melting glass 12 may be replaced with any sealing member made of a highly rigid material such as metallic solder, epoxy resin or the like to rigidly adhere the glass plates 1A and 113 to each other at the outer peripheries thereof.

INDUSTRIAL UTILITY

The glass panels according to the present invention may be used for various purposes with the decompression void maintained in a decompressed condition, e.g. for buildings and vehicles (windshields of automobiles, railway carriages, and ships and vessels), for elements of machinery and tools (front glass of plasma displays, doors and walls of refrigerators, and doors and walls of heat-insulated device) and the like.

The foregoing embodiments employ the vacuum double glazing with the decompression void maintained in a decompressed condition as an example of glass panels. The present invention may be applied to simple double glazing with a decompression void filled with air or an inert gas and maintained at atmospheric pressure. In any case, the glass plates used for the glass panel are not limited to float glass as described in the foregoing embodiments, but a material may be selected as appropriate. For example, it is possible to use heat-absorbing glass, heat-reflecting glass, high-performance heat-reflecting glass, wire glass, net glass, figured glass, tempered glass, double-reinforced glass, low-reflecting glass, high-penetrable glass, obscured glass (glass surface-treated to have a light diffusing function), tapestry (frost) glass, ceramic print glass, laminated glass and the like, alone or in combination, and regardless of thickness (e.g. glass with a thickness of 3.2 mm or more).

Further, with regard to glass composition, soda silica glass (soda-lime silica glass), boric silica glass, aluminosilicate glass, and various types of crystallized glass may be used.

The invention claimed is:

1. A method of manufacturing a glass panel comprising a pair of glass plates opposed to each other;
   spacers disposed between said pair of glass plates for maintaining a gap therebetween; and
   a sealing member having a lower melting point than said glass plates for sealing said pair of glass plates at outer peripheries thereof to form a decompression void between said pair of glass plates, said method comprising the steps of:
   applying said low melting point sealing member to said outer peripheries of said pair of glass plates in a melted condition;
   causing said sealing member to start hardening from an outer surface thereof exposed to the atmosphere by lowering an atmospheric temperature; and
   causing said pair of glass plates to start cooling from outer surfaces thereof to apply a compressive force to said glass plates;
   wherein said glass plates have a compressive force at outer surfaces of the outer peripheries thereof exposed to the atmosphere, with said decompression void being in atmospheric condition, so that an area of said glass plates between said sealing member and an outermost one of said spacers is formed concave toward said decompression void.

* * * * *